United States Patent

[11] 3,576,396

[72] Inventor Mark A. Sloate
Costa Mesa, Calif.
[21] Appl. No. 673,664
[22] Filed Oct. 9, 1967
[45] Patented Apr. 27, 1971
[73] Assignee Collins Radio Company
Cedar Rapids, Iowa

[54] MEANS FOR ADAPTING A TRANSMITTED SIGNAL TO A RECEIVER WITH SYNCHRONIZED FRAME RATES BUT UNEQUAL BIT RATES
2 Claims, 8 Drawing Figs.

[52] U.S. Cl. .......... 178/69.5F, 340/172.5, 325/325, 307/269
[51] Int. Cl. .......... G06f 5/06, H041 7/08
[50] Field of Search .......... 178/69.5 (DC), 69.5, 50; 325/325; 340/146.2, 172.5, 347; 307/269; 328/63, 72; 235/154, 92; 179/50, 15 (SYNC), 15 (ASYNC), 15 (BWR)

[56] References Cited

UNITED STATES PATENTS

| | | | |
|---|---|---|---|
| 3,127,475 | 3/1964 | Coulter .......... | 179/15 |
| 3,384,707 | 5/1968 | Bopp et al. .......... | 178/6.6 |
| 3,421,147 | 1/1969 | Burton et al. .......... | 340/172.5 |
| 3,454,719 | 7/1969 | Horstmann et al. .......... | 178/69.5 |
| 3,497,627 | 2/1970 | Blasbalg et al. .......... | 179/15 |

*Primary Examiner*—Richard Murray
*Assistant Examiner*—John C. Martin
*Attorneys*—Robert J. Crawford and Bruce C. Lutz

ABSTRACT: Means for synchronizing the unequal bit rates of a received signal and the receiver when frame rates are synchronized, comprising a shift register to which is supplied the received data bits. A counter means counts the bits received in each received frame. At each receiver frame synchronizing pulse the counter output is supplied to a matrix which responds thereto to address that shift register stage corresponding to the count in the counter and to connect said stage through the matrix to a gating means at the output thereof. Upon occurrence of each subsequent receiver bit-synchronizing pulse the counter is decremented by one and the gating means passes the data bit stored in the addressed shift register stage. Because of counter incrementing by each received data bit and counter decrementing each time a bit is read from the shift register, the resultant count will always correspond to that shift register stage containing the next data bit to be transferred therefrom.

Figure 1:
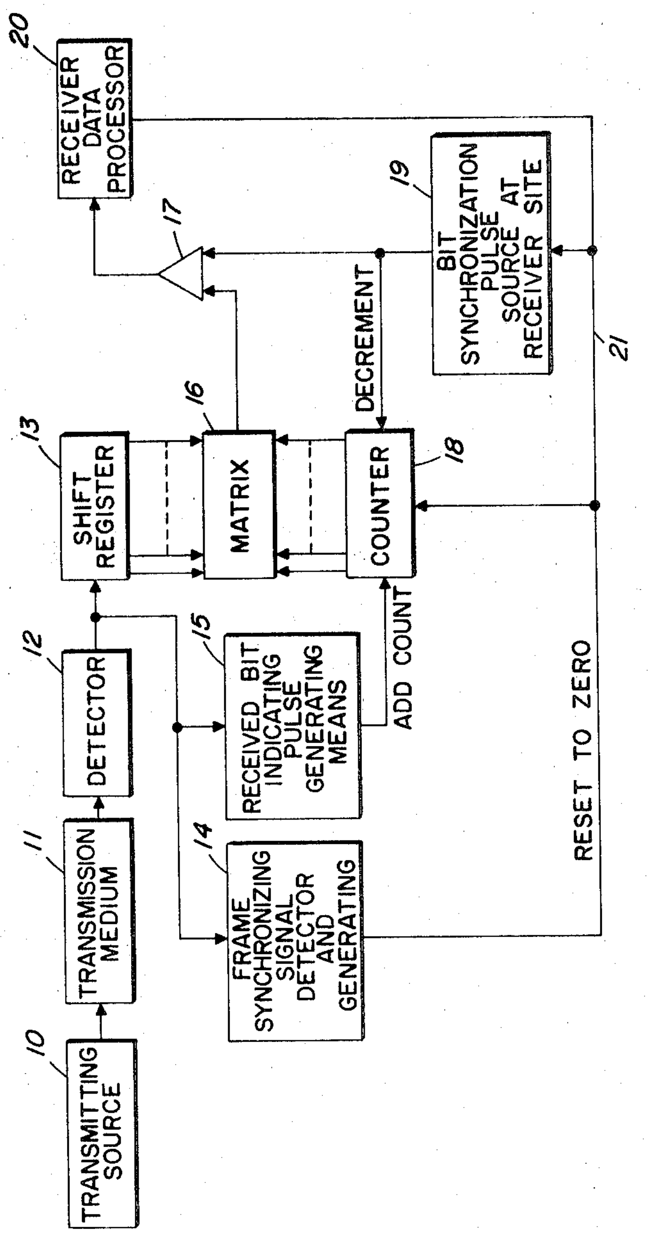

INVENTOR.
MARK A. SLOATE
BY Donald W. Phillips
ATTORNEY

INVENTOR.
MARK A. SLOATE
BY Donald W. Phillion
ATTORNEY

MEANS FOR ADAPTING A TRANSMITTED SIGNAL TO A RECEIVER WITH SYNCHRONIZED FRAME RATES BUT UNEQUAL BIT RATES

This invention relates generally to a means for receiving transmitted data in which the bit rate of the said received data is different from the bit rate of the receiving equipment and, more specifically, to a simplified buffer storage means which adapts the bit rate of a received transmitted signal to a receiver system when the frame rates of the received signal and the receiving system are the same and are synchronized but the bit rates are unequal.

In the transmission of data to a receiver, two distinct problems of synchronization often occur, the first of which involves frame synchronization. More specifically, the propagation delay over the transmission path can cause the data frames to arrive at the receiver out of synchronization with a fixed timeclock at the receiver. The second problem relates to bit synchronization. In some data transmission systems the receiver bit rate is different from the bit rate of the received transmitted words. In those cases where the receiver bit rate is lower than the bit rate of the received words, it is possible to transmit the words with the time gap between the words so that the frame rate of the transmitted words and the frame rate of the timeclock at the receiver are equal. The transmitted word can then be reformed with a new bit rate equal to the receiver bit rate. A third problem can arise when both frame synchronization and bit synchronization of the received transmitted word are not suitable for direct reception by the receiver.

In prior art structures the above-mentioned problems of synchronizing both the frame and bit rates of the receiver signal to those of the receiver are usually accomplished by some type of buffer storage. A common type of buffer storage involves the use of magnetic cores with a plurality of address locations therein. The received words are stored in the various address locations, and then at appropriate times, both with respect to frame synchronization and bit synchronization, are retransmitted to the receiver, which may be a data processing equipment. Other types of buffer storage memories include circulating memories capable of receiving information from peripheral devices, such as teletypewriters, at a relatively slow rate and then periodically delivering the Teletype codes to a data processor at the much faster bit rate of the data processor, and with the proper frame synchronization. Reference is made to copending U.S. Application, Ser. No. 434,964, filed Feb. 24, 1965, by Robert J. Hirvela, now U.S. Pat. No. 3,350,697, issued Oct. 31, 1967 and entitled "Storage Means for Receiving, Assembling, and Distributing Teletype Characters", and copending U.S. Application, Ser. No. 519,732, filed Jan. 10, 1966, by Melvin M. Hutchinson and William J. Melvin now U.S. Pat. No. 3,432,816, issued Mar. 11, 1969 and entitled "Glass Delay Line Recirculating Memory" for a more complete description of this type buffer storage memory.

Although the above-mentioned prior art devices have proven quite satisfactory in handling incoming data and also outgoing data with respect to frame and bit synchronization and also with respect to storage over longer periods of time, they are quite expensive and relatively complex. As indicated above, they are designed to handle buffer storage requirements of time intervals exceeding a frame length. More specifically, they are designed to handle the rather large differences between the frame and bit times of peripheral devices such as teletypewriters, for example, and the frame and bit times of a data processor, for example. There is a need in the prior art for a buffer storage device of a somewhat lesser capacity which is capable of handling the frame and bit-synchronizing differences between the received transmitted data and the receiver when those differences are relatively small, as for example, those frame synchronization problems arising from propagation delay and those bit rate synchronizing occurring when the bit rates of the received signal and the receiver are unequal but the frame rates are equal.

A buffer storage device for adapting a received transmitted signal to a receiver where the frame and bit rates of the transmitted signal and the receiver are equal but the frame rates are not synchronized, is disclosed in copending application Ser. No. 673,903 filed Oct. 9, 1967 by Mark A. Sloate, now U.S. Pat. No. 3,531,776 and entitled "Means for Synchronizing Equal but Unsynchronized Frame Rates of Received Signal and Receiver." Other buffer storage means of a limited capacity for adapting a received transmitted signal to a receiver where the frame rates are equal but not synchronized, and where the bit rates are unequal, is disclosed in copending application Ser. No. 673,669 filed Oct. 9, 1967 by Mark A. Sloate now issued as U.S. Pat. No. 3,506,786 and entitled "-Means for Synchronizing Frame and Bit Rates of a Received Signal With a Receiver."

It is a primary object of the present invention to provide a means for maintaining bit synchronization between a received transmitted signal and a receiving system when the frame rates of the received signal and the receiving system are equal and synchronized but the bit rates are unequal.

Another purpose of the invention is to provide a means for transforming the bit rate of a received transmitted signal to the bit rate of said receiver when the frame rates of the received signal and the receiver are the same and are synchronized.

A third purpose of the invention is a relatively simple and inexpensive buffer storage means for adapting the bit rate of a received signal to the bit rate of a receiving system when said bit rates are unequal but when the frame rates of the received signal and the receiving system are the same and are synchronized.

A fourth purpose of the invention is the improvement of buffer storage and synchronizing adapting means generally.

In accordance with one form of the invention, the transmitted data is received with a frame rate equal to and synchronous with the frame rate of the receiving system. The bit rate of the received signal, however, is higher than that of the receiver so that each received frame consists of a period during which data bits are being received, followed by a blank period, with the two periods equaling the frame period.

The bit rate of the receiver is usually time synchronous, i.e., the time spacing between bits in the receiver is equal to a frame period divided by the number of bits in a frame. At the receiver the frame synchronizing signal and the bit-synchronizing signal of the received signal are extracted therefrom, with the frame-synchronizing pulse of each frame being employed to energize (reset to zero) a counter which will thereafter, in each frame, add a count of one for each bit received during the frame. The received bits are also supplied to a shift register, with the count contained in the counter during any given frame indicating the stage to which the first bit of the received frame has been shifted. Thus, for example, after two bits of a frame have been received, the first bit will occupy the second stage of the shift register and the counter will contain a count of two, assuming that no bits have been read out of the shift register and into the system output. Such reading of bits from the shift register to the system output is effected by means of a matrix system which responds to the count contained in the counter to access a given stage of the shift register (the second stage), and to establish a circuit path from said accessed stage through the matrix, and to the output circuit, which can be a data processor, for example.

As defined above, the frame rate of the received signal and the receiver are equal and synchronous, with the bit rate of the received signal being greater than that of the receiver system, however. Thus at least two data bits will have entered into the shift register before the receiver is ready to receive the first bit. At this time the counter will contain a count of two. However, when the first received bit is read out to the receiving system upon occurrence of a bit-synchronizing pulse of said receiving system, the count in the counter is decremented by one to change the count therein from two to one. Thus the first stage of the shift register is now accessed by said counter.

If now a third bit is entered into the shift register before a second bit is transferred out, the data bit stored in the first stage of the shift register will be shifted into the second stage thereof and the counter will advance back to a count of two. In this manner the count of the counter is always maintained at the proper level for accessing the particular stage of the shift register containing the next bit to be transferred therefrom to the matrix and then to the receiver.

The above-mentioned and other objects and features of the invention will be more fully understood from the following detailed description thereof when read in conjunction with the drawings in which:

FIG. 1 is a logic diagram of the invention; and

FIG. 2A to 2G consists of a group of waveforms showing the relation between the frame and bit timing of the received transmitted signal and the receiver system.

Figure 2:
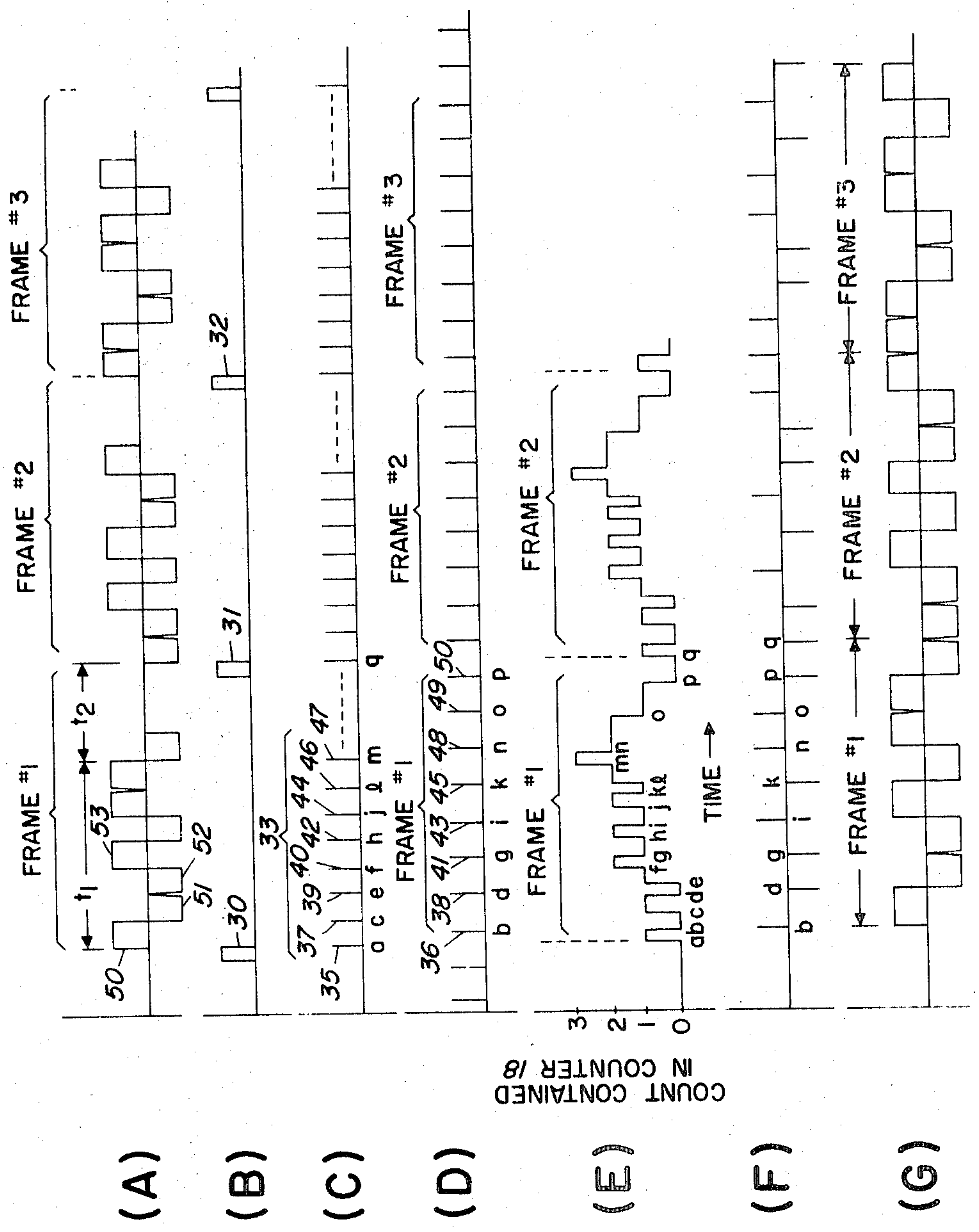

Referring now to the circuit of FIG. 1, a serial-type data signal is supplied from a transmitting source 10 through a suitable transmission media 11 to a detector 12, which functions to derive a two-level signal of the type shown in FIG. 2A. It will be noted that each frame of the waveform of FIG. 2A is divided into two time intervals. For example, frame 01 is composed of a first time interval $t_1$ which contains the data bits of the frame, and a second time interval $t_2$ during which nothing is transmitted. The necessity for the frame interval being greater than time interval $t_1$ is caused by the frame timing of the receiver system, which frame timing is shown in FIG. 2B. The primary function of the present invention is to change the bit rate of the received signal, as shown in FIG. 2A, to the bit rate of the receiver, as shown in FIG. 2G.

Returning again to a general description of the circuit, the frame-synchronizing detector and generating means 14 responds to the two-level signal output of detector 12 to produce frame-synchronizing pulses of the received transmitted signal as shown in FIG. 2B. Since these frame-synchronizing pulses also represent the frame-synchronizing signal of the receiver, no separate frame-synchronizing pulse generator for the receiver is required. The output of frame-synchronizing signal generator 14 is supplied directly to bit-synchronizing pulse source generator 19 and to the receiver data processor 20 where it is utilized in a manner to be described later.

The received bit indicating pulse source 15 responds to the detected two-level output signal from detector 12 to generate the bit-indicating pulse train shown in FIG. 2C. For reasons discussed below, the received bit indicating pulse train of FIG. 3C is composed of a burst of pulses exactly equal to the number of bits in each frame.

As the data bits of each frame, such as frame 01 of FIG. 2A, are supplied to shift register 13, corresponding bit-indicating pulses, such as pulses 33 of FIG. 2C, are supplied to counter 18; one such bit-indicating pulse for each data bit supplied to the shift register. Matrix 16, under the control of the count contained in counter 18, functions to complete a circuit path from a specific addressed stage of shift register 13, through matrix 16, AND gate 17 to receiver 20. For example, if counter 18 contains a count of two, then the second stage of shift register 13 is accessed by matrix 16 so that the data bit stored in said second stage is supplied through matrix 16, AND gate 17 and to the receiver 20. Timing for the transfer of the data from the second stage of shift register 13 to receiver 20 is provided by the output of bit-synchronizing generating means 19 which opens AND gate 17 at the proper bit-synchronizing timing of the receiver. The bit-synchronizing output pulses of generating means 19 are shown in FIG. 2D.

Each time that a data bit is transferred from an accessed stage of shift register 13 through matrix 16, AND gate 17, to receiver 20, the counter 18 is decremented by a count of one by the corresponding bit-synchronizing pulse from source 19. In this manner the count contained in the counter 18 is always of the proper value to access that stage of shift register 13 containing the next data bit to be transferred through matrix 16, AND gate 17, to receiver 20.

As a specific example of the operation assume the following conditions. Assume that a train of three frames of data bits, as shown in FIG. 2A, appears at the output of detector 12. The frame-synchronizing detector 14 will respond thereto to produce the frame-synchronizing pulses 30, 31, and 32 of FIG. 2B, and the bit-synchronizing pulse source 15 will respond thereto to generate the bit-indicating pulses, such as the eight pulses 33 of frame 01 of FIG. 2C.

The synchronizing pulse source 19 is responsive to the framing pulse 30 and also to subsequent framing pulses such as pulses 31 and 32 to generate the stream of receiver bit synchronizing pulses shown in FIG. 2D, which govern the bit timing of the receiver data processor 20.

It should be noted that since the receiver 20 employs the same frame synchronization as the received transmitted signal, the output of frame synchronizing generator 14 can be supplied directly to the receiver 20 through lead 21.

The counter 18 is initially reset to zero by the framing pulse 30 from source 14. The next pulse to be supplied to counter 18 is the pulse 35 of FIG. 2C, which functions to change the count of the counter 18 from a zero to a one, as shown at time *a* in FIG. 2E. The next pulse received is the receiver bit-synchronizing pulse 36 of FIG. 2D, which functions to decrement counter 18 back to a count of zero, as shown at time *b* in FIG. 2E.

The next occurring pulse is pulse 37 of FIG. 2C from bit-indicating pulse generator 15 which adds to the count of counter 18, changing the count thereof back to one, as shown at time *c* in FIG. 2E. The following count is a decrementing count 38 (FIG. 2D) from generator 19, which changes the count of counter 18 back to a zero, as shown at time *d* in FIG. 2F. The following pulse is pulse 39 of FIG. 2C which causes the counter to add a count, thereby returning to a count of one, as shown at time *e* in FIG. 2E.

Now, before the next decrementing count can occur a second adding count 40 (FIG. 2C) occurs at time *f* which causes the count in counter 18 to change from a one to a two, as shown in FIG. 2E.

The process of adding and decrementing counts from the counter 18 can be followed through frame 01 in a similar manner until time *q* of FIG. 2E, at which time the cycle begins anew for frame 02. It will be observed that the count contained in counter 18 is always representative of the stage of shift register 13 which contains the next data bit to be transferred therefrom through matrix 16 and AND gate 17 to receiver 20.

More specifically, each time the counter 18 is decremented by a count of one, AND gate 17 is caused to be opened to complete the electrical path from that particular stage of the shift register 13 which corresponds to the count contained in the counter 18 at that time.

Thus, at time *b* in FIG. 2E, for example, when the first decrementing pulse 36 of FIG. 2D occurred, the counter contained a count of one. It will be noted that at time *b* only the first bit 50 of FIG. 2A had been entered into the shift register. Thus immediately before the time *b*, when counter 18 contains a count of one, matrix 16 will respond to said count of one to access the first stage of shift register 13. Then when the receiver bit synchronizing pulse 36 occurs at time *b* to open AND gate 17, the data contained in the first stage of shift register 13 will be supplied through the matrix 16, AND gate 17, and to the receiver 20.

As another example, immediately before time *g* in FIG. 2E, counter 18 contains a count of two. Also immediately before time *g* four data bits 50, 51, 52, and 53 have been entered into shift register 13. However, bits 50 and 51 have been transferred from the shift register to the receiver 20 by means of receiver bit-synchronizing pulses 36 and 38, which also function to decrement the counter 18 by a count of two, thus leaving a count of two in counter 18. Consequently, at time *g* the bit 52, which was the third bit entered into shift register 13, will be in stage two thereof, and will be the next bit to be transferred therefrom.

It can be seen that since counter 18 contains a count of two and the third bit 52 is in stage two, bit-synchronizing pulse 41 of FIG. 3D will function to shift bit 52 of FIG. 3A from shift register 13 to matrix 16, and then through AND gate 17 to receiver 20, and will also function to decrement counter 18 by one, back to a count of one.

FIG. 2F represents the samplings taken from shift register 13 by receiver bit-synchronizing pulses of FIG. 2D, and supplied to receiver 20. The pulses of FIG. 2F are positive or negative in accordance with the samplings taken from shift register 13. In the receiver 20 there is structure which is not shown, but which is well known in the art and which responds to the pulses of FIG. 2F to produce the two-level signal shown in FIG. 2G. The two-level waveform of FIG. 2G can be seen to be a reproduction of the two-level signal of FIG. 2A, except that the data bits are now on a different time scale and are time synchronous.

It is to be understood that the form of the invention shown and described herein is but a preferred embodiment thereof, and that various changes, particularly changes in the logic arrangement, can be made by those skilled in the art without departing from the spirit or the scope of the invention.

I claim:

1. Means for synchronizing the unequal bit rates of a received transmitted signal and a receiver when the frame rates of the received signal and the receiver are equal and synchronous and comprising:

receiving means for receiving a transmitted binary signal and for supplying a serial binary-type signal with N data bits in each frame as an output;

shift register means having a plurality of stages and connected to said receiving means to receive said serial binary-type signal, said shift register means advancing each data bit along successive stages in said shift register means as further data bits are entered therein;

bit-indicating pulse generating means connected to said receiving means for generating a train of bit-indicating pulses in response to and marking the reception of each of said N data bits in said output serial binary-type signal;

synchronizing pulse generating means connected to said receiving means for generating a first train of bit-synchronizing pulses marking the bit occurrence rate of said serial binary-type signal of said receiver and for generating a second train of frame-synchronizing pulses responsive to the received signal;

counter means connected to said bit-indicating and synchronizing pulse-generating means and responsive to each of said bit-indicating pulses to increment its count by one, to each of said bit-synchronizing pulses to decrement its count by one, and to each of said frame-synchronizing pulses to reset said counter means to a predetermined reference count; and switching means connected to said counter means and to said shift register means and comprising matrix means having input and output means and responsive to the count in said counter means to connect a corresponding stage of said shift register through said input means thereof to said output means.

2. Means for synchronizing the bit rate of a received signal comprised of a serial train of data pulses, with the bit rate of a receiver, when the frame rates of the received signal and the receiver are synchronized, and comprising:

receiving means for supplying an output signal comprising a serial train of output data pulse signals indicative of received data;

shift register means connected to said receiving means and having a plurality of stages for receiving the pulse signals therefrom;

counting means;

apparatus output means for providing output signals having the same data contact as the received signal but at a different data bit rate;

switching means connected to said shift register means and to said counting means and comprising a matrix responsive to the count of said counting means to connect a corresponding stage of said shift register means to said apparatus output means;

first generating means connected to said receiving means to receive said output pulses therefrom and connected to said counting means for supplying generated bit-indicating pulses of said receive signal thereto;

second generating means connected between said receiving means and said counting means for supplying bit and frame-synchronizing pulses to said counting means responsive to said receive signal; and said counting means being responsive to each of said bit-indicating pulses to increment its count by one from a predetermined reference count indicative of said receive signal, to each of said bit-synchronizing pulses of said receiver to decrement its count by one and to each of said frame synchronizing pulses to become reset to said predetermined reference count.